United States Patent
Namou et al.

(10) Patent No.: US 9,024,590 B2
(45) Date of Patent: May 5, 2015

(54) VEHICLE BATTERY DISCHARGE SYSTEMS AND METHODS USING FIELD ACCESS POINTS

(71) Applicant: GM Global Technology Operations LLC, Detroit, MI (US)

(72) Inventors: Andrew J. Namou, West Bloomfield, MI (US); Todd F. MacKintosh, Macomb, MI (US)

(73) Assignee: GM Global Technology Operations LLC, Detroit, MI (US)

(*) Notice: Subject to any disclaimer, the term of this patent is extended or adjusted under 35 U.S.C. 154(b) by 327 days.

(21) Appl. No.: 13/674,518

(22) Filed: Nov. 12, 2012

(65) Prior Publication Data

US 2014/0132219 A1 May 15, 2014

(51) Int. Cl.
*H01M 10/46* (2006.01)
*H02J 7/00* (2006.01)

(52) U.S. Cl.
CPC ............... *H02J 7/00* (2013.01); *Y02T 10/7005* (2013.01)

(58) Field of Classification Search
CPC  H02J 2007/0067; H02J 7/0063; H01M 10/44
USPC .................. 320/104, 107, 109, 116, 127, 135
See application file for complete search history.

(56) References Cited

U.S. PATENT DOCUMENTS

| 2011/0181244 A1* | 7/2011 | Badger ......................... 320/117 |
| 2011/0221374 A1* | 9/2011 | Maebara et al. ............... 318/494 |

* cited by examiner

*Primary Examiner* — Edward Tso
(74) *Attorney, Agent, or Firm* — John P. Davis; Phillips Ryther & Winchester (57) ABSTRACT

System and methods for discharging a battery system in a vehicle are presented. In certain embodiments, a battery system included in a vehicle may include a high voltage cell stack and at least one access point configured to selectively couple the high voltage cell stack with a discharging system connector associated with a discharging system. The at least one access point may include a receptacle configured to receive the discharging system connector and selectively couple the discharging system connector across the high voltage cell stack to allow for electrical energy to be discharged from the cell stack to an external discharging system.

20 Claims, 4 Drawing Sheets

VEHICLE BATTERY DISCHARGE SYSTEMS AND METHODS USING FIELD ACCESS POINTS

TECHNICAL FIELD

This disclosure relates to systems and methods for discharging a battery system in a vehicle. More specifically, but not exclusively, this disclosure relates to systems and methods that facilitate the safe discharge of high voltage energy stored in a vehicle battery system utilizing one or more access points.

BACKGROUND

Passenger vehicles often include electric batteries for operating features of a vehicle's electrical and drivetrain systems. For example, vehicles commonly include a 12V lead-acid automotive battery configured to supply electric energy to vehicle starter systems (e.g., a starter motor), lighting systems, and/or ignition systems. In electric, fuel cell ("FC"), and/or hybrid vehicles, a high voltage ("HV") battery system (e.g., a 360 V HV battery system) may be used to power electric drivetrain components of the vehicle (e.g., electric drive motors and the like). For example, an HV rechargeable energy storage system ("RESS") included in a vehicle may be used to power electric drivetrain components of the vehicle.

Following an impact event (e.g., a vehicle collision), it may be desirable to discharge high voltage energy from a vehicle battery system. Similarly, it may be desirable to discharge high voltage energy from a vehicle battery system prior to performing certain maintenance and/or repair operations on the vehicle. Discharging high voltage energy in such scenarios may help prevent electric shock due to unintentional discharge. In conventional systems, however, accessing a vehicle battery system to perform discharging operations may be difficult. For example, a conventional battery system may be difficult to access following an impact event (e.g., due to damage to the vehicle) or during vehicle maintenance and/or repair.

SUMMARY

Systems and methods are presented for discharging a battery system in a vehicle. In certain embodiments, a battery system included in a vehicle may include a HV cell stack and at least one access point configured to selectively couple the HV cell stack with a discharging system connector. The one access point may include a receptacle configured to receive the discharging system connector, one or more high voltage contacts disposed in the receptacle configured to contact with one or more conductors included in the discharging system connector when the discharging system connector is received in the receptacle, and one or more selectively actuated switches disposed in the receptacle configured to electrically couple the one or more high voltage contacts across the HV cell stack when the discharging system connector is received in the receptacle. In this manner, when the discharging system connector is coupled to the access point, a discharging system associated with the discharging system connector may discharge electrical energy in the HV cell stack.

In further embodiments a discharging system configured to discharge a battery system included in a vehicle may include a load configured to consume electrical energy provided by the battery system and a discharging system connector configured to couple the load to the battery system via at least one access point included in the vehicle. The discharging system connector may include one or more conductors configured to contact one or more HV contacts included in the at least one access point when the discharging system connector is received in a receptacle associated with the access point, and one or more actuators configured to selectively actuate one or more switches to couple HV contacts across a HV cell stack of the battery system when the discharging system connector is received in the receptacle. In this manner, when the discharging system connector is coupled to the access point, a discharging system associated with the discharging system connector may discharge electrical energy in the HV cell stack.

In some embodiments, the at least one access point may be associated with a manual disconnect ("MD") of the battery system. In such embodiments, the one or more selectively actuated switches further configured to couple the one or more HV contacts across the HV cell stack by creating a short across a HV bus of the HV cell stack. In further embodiments, the at least one access point may be associated with a HV power feed of the battery system. In certain embodiments, the one or more selectively actuated switches are configured to be actuated by one or more pins included in the discharging system connector when the discharging system connector is received in the receptacle. In further embodiments, one or more HV contacts and/or selectively actuated switches may be disposed in one or more recessed channels included in the receptacle.

In certain embodiments, a vehicle may comprise a HV battery system and a plurality of redundant access points coupled with the HV battery system, each redundant access point configured to receive a discharging system connector associated with a discharging system configured to discharge the high voltage battery system when coupled to the redundant access point. Utilizing a plurality of redundant access points may allow for discharging operations to be performed at various locations on a vehicle.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure will be best understood by reference to the drawings, wherein like parts may be designated by like numerals. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

Embodiments of the systems and methods disclosed herein may utilize one or more access points to safely discharge HV energy stored in a vehicle battery system. The one or more access points may be disposed at one or more accessible locations on a vehicle, and may thus facilitate discharging of the HV battery system during field operations (e.g., by public safety personnel discharging an HV battery system following an impact event by vehicle repair professionals discharging an HV battery system prior to performing certain maintenance operations, and/or the like). For example, after first responders extract and/or treat vehicle passengers as necessary following an impact event, one or more second responders may perform field discharging operations (e.g., prior to transport of the vehicle or the like). In certain embodiments, the one or more access points may be included in or in proximity to an MD of the vehicle's battery system and/or in a vehicle's battery system HV power feed. In further embodiments, a plurality of redundant access points disposed at various locations on a vehicle may be utilized. By providing redundant access points, battery discharge operations may be performed even if a portion of the vehicle and/or one or more access points are damaged (e.g., due to a vehicle collision or the like). For example, according to one embodiment, redundant access points may be provided at the front of a vehicle and at the back of a vehicle. In an impact event causing damage to the front end of the vehicle, the HV battery system may be discharged using the access point located at the back of the vehicle. In an impact event causing damage to the back end of the vehicle, the HV battery system may be discharged using the access point located at the front of the vehicle.

Figure 1:
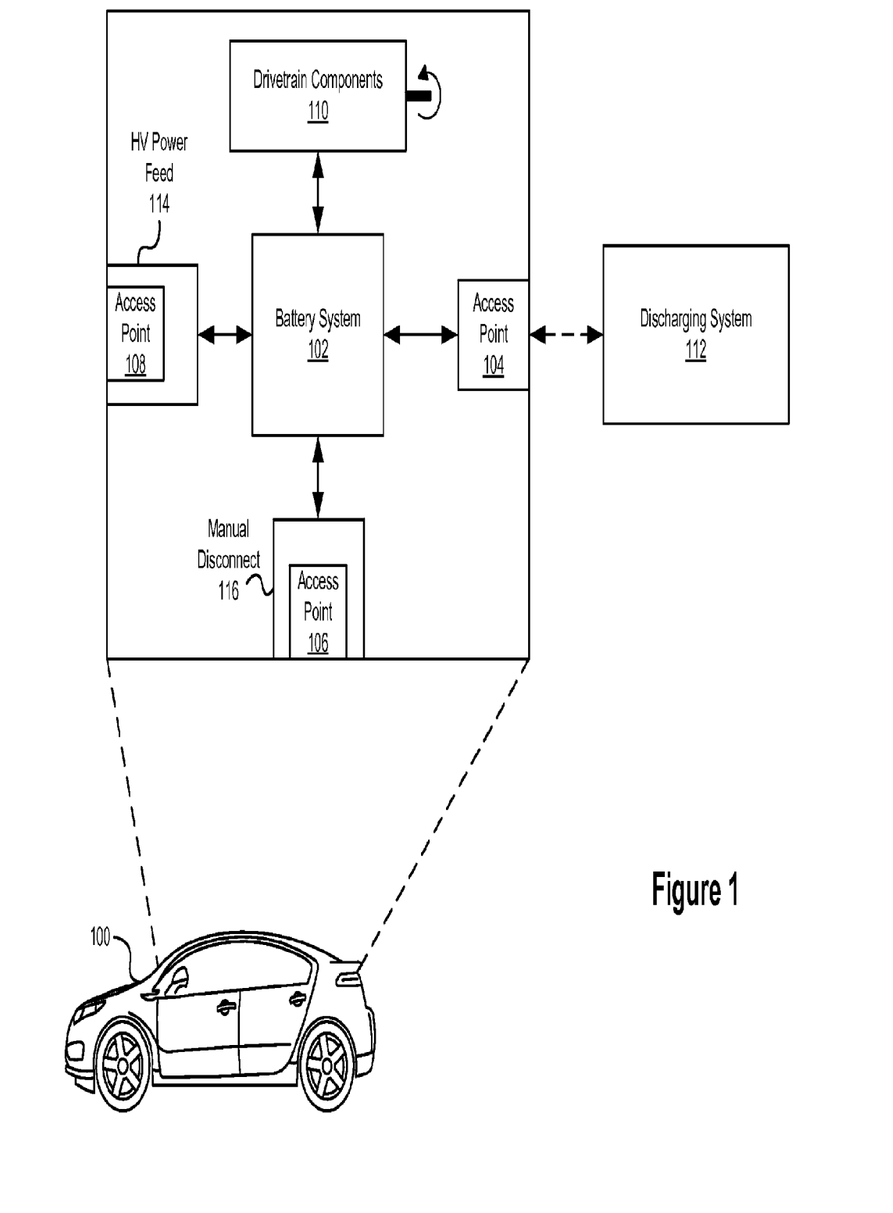
FIG. 1 illustrates a system for discharging an HV battery system in a vehicle consistent with embodiments disclosed herein.

FIG. 1 illustrates an example of a system for discharging a battery system in a vehicle 100 consistent with embodiments disclosed herein. The vehicle 100 may be a motor vehicle, a marine vehicle, an aircraft, and/or any other type of vehicle, and may include an internal combustion engine ("ICE") drivetrain, an electric motor drivetrain, a hybrid engine drivetrain, a FC drivetrain, and/or any other type of drivetrain suitable for incorporating the systems and methods disclosed herein. The vehicle 100 may include a battery system 102 that, in certain embodiments, may be a HV battery system (e.g., a HV RESS). The HV battery system may be used to power electric drivetrain components 110 (e.g., as in an electric, hybrid, or FC power system) via a HV DC output. In further embodiments, the battery system 102 may be a low voltage battery (e.g., a lead-acid 12V automotive battery) and may be configured to supply electric energy to a variety of vehicle 100 systems including, for example, vehicle starter systems (e.g., a starter motor), lighting systems, audio systems, and/or the like.

The battery system 102 may include a battery control system (not shown). The battery control system may be configured to monitor and control certain operations of the battery system. For example, the battery control system may be configured to monitor and control charging, discharging, and/or balancing operations of the battery system. In certain embodiments, the battery control system may be utilized according to some embodiments to implement, at least in part, the discharging operations disclosed herein. In further embodiments, discharging operations disclosed herein may be performed independent of the battery control system. In certain embodiments, the battery control system may be communicatively coupled with one or more sensors, actuation devices (e.g., electrical relays), and/or systems configured to enable the battery control system to monitor and control operations of the battery system. The battery control system may further be configured to provide information to and/or receive information from other systems included in the vehicle 100. For example, the battery control system may be communicatively coupled with an internal vehicle computer system and/or an external computer system (not shown). In certain embodiments, the battery control system may be configured, at least in part, to provide information regarding the battery system 102 to a user of the vehicle 100, public safety officials, maintenance personnel, etc. Such information may include, for example, battery state of charge information, battery voltage, battery discharge information, and/or any other information regarding a state or condition of the battery system 102.

The battery system 102 may include one or more battery packs suitably sized to provide electrical power to the vehicle 100. Each battery pack may include one or more battery sections comprising one or more battery cells utilizing any suitable battery technology including, for example, lead-acid, nickel-metal hydride ("NiMH"), lithium-ion ("Li-Ion"), Li-Ion polymer, lithium-air, nickel-cadmium ("NiCad"), valve-regulated lead-acid ("VRLA") including absorbed glass mat ("AGM"), nickel-zinc ("NiZn"), molten salt (e.g., a ZEBRA battery), and/or other suitable battery technologies.

As illustrated, one or more access points 104-108 may be electrically coupled to the battery system 102. When any of access points 104-108 are connected to a discharging system 112 using any suitable interface or connector, discharging system 112 may discharge electrical energy stored in the battery system 102. In some embodiments, a single discharging system 112 may be connected to any of access points 104-108. In further embodiments, any number of discharging systems 112 may be connected to any number of access points 104-108. As discussed in more detail below in reference to FIG. 2 and FIG. 3, access points 104-108 may be configured to allow for discharging of battery system 102 by discharging system 112 only when connected to discharging system connector (e.g., via a mechanical switching mechanism or the like), thereby mitigating against the possibility of unintentional discharge of battery system 102.

In certain embodiments, discharging system 112 may comprise one or more electrical loads suitably sized to discharge battery system 102 at a desired rate. In some embodiments, discharging system 112 may discharge battery system 102 over a particular time period (e.g., hours) and may comprise one or more resistive loads and/or power electronics configured to facilitate discharging operations. Discharging system 112 may be configured to allow for discharging operations to be performed in field situations (e.g., roadside rescue operations by public safety personnel) and, accordingly, may be configured as a portable and/or semi-portable system.

In certain embodiments, one or more of the access points (e.g., access point 106) may be included in and/or associated with or in proximity to an MD 116 of battery system 102. When removed from an MD receptacle, the MD 116 may be configured to physically interrupt certain HV lines internal to the battery system 102, thereby disabling the battery system 102. When the battery system 102 is disabled by removal of the MD 116 from the MD receptacle, however, HV energy may still remained stored in the battery system 102. In some embodiments, when MD 116 is removed from the MD receptacle, access point 106 may be made accessible, thereby allowing a user to connect discharging system 112 to access point 106 and perform discharging operations. In further embodiments, access point 106 may be accessible by discharging system 112 regardless of whether MD 116 is removed from the MD receptacle.

The MD 116 may be located in a midpoint of a battery system 102 (e.g., a midpoint of a cell stack of the battery system). Accordingly, when the MD 116 is removed, approximately half of the pack voltage of the battery system 102 may reside on either side of the MD 116 connection. In further embodiments, MD 116 may be located in any suitable location relative to the internal architecture of battery system 102. When discharging system 112 is coupled to access point 106 included in and/or associated with MD 116, HV energy stored in the battery system 102 may be discharged through access point 106.

In some embodiments, one or more access points (e.g., access point 108) may be included in and/or associated with a HV power feed 114 of battery system 102. HV power feed 114 may be utilized in charging operations of battery system 102. For example, HV power feed 114 may include a receptacle configured to interface with a suitable charging connector (e.g., a SAE J1772 standard connector or the like) configured to charge battery system 102. Access point 108 may be integrated into the receptacle and be configured to connect with discharging system 112 when an interface of discharging system 112 is connected to the receptacle or a portion of the receptacle.

In some embodiments, one or more access points (e.g., access point 108) may be disposed at various locations on the vehicle 100. In certain embodiments, locating access points 104-108 at different locations on the vehicle 100 may help to ensure that at least one of access points 104-108 is accessible. For example, a location of the vehicle 100 relative to other objects may impede access to one of access points 104-108. Accordingly, by including one or more redundant access points 104-108 on vehicle 100, at least one of the access points 104-108 may be accessible regardless of the location of the vehicle 100. Similarly, an impact event (e.g., a vehicle collision or the like) may prevent access to and/or damage one or more of the access points 104-108, rendering such access points 104-108 inaccessible and/or unusable. At least one redundant access point of access points 104-108 may, however, remain accessible and/or undamaged. Using the redundant access point of access points 104-108, discharging operations may be performed using discharging system 112.

In certain embodiments, discharging system 112 may interface (e.g., connect and/or electrically couple) with access points 104-108 using any suitable connection. In some embodiments, access points 104-108 may include a receptacle configured to interface with a connector (not shown) associated with discharging system 112. In certain embodiments, the connector may be a standardized connector, thereby allowing discharging system 112 to interface with any access point 104-108 incorporated in any vehicle 100 implementing the standardized connector regardless of manufacturer or model of the vehicle. Utilizing a standardized connector may allow for public safety personnel to perform field discharging operations on a variety of vehicles using the same discharging system 112, and thereby reducing the need for vehicle-specific discharging systems.

In further embodiments, access points 104-108 may integrate one or more mechanical connections to secure a connector associated with discharging system 112 within access points 104-108. In certain embodiments, securing the connector associated with discharging system 112 within access points 104-108 may increase safety during discharging operations. In some embodiments, access points 104-108 and/or a connector of discharging system 112 may include one or more mechanical switching mechanisms and/or any other suitable mechanism (e.g., an electrically actuated switch) configured to allow for discharge of battery system 102 only when access points 104-108 are connected to discharging system 112 (e.g., via a connector associated with discharging system 112). Such a mechanism may further be configured to reduce the likelihood of a user contacting portions of battery systems 102 that may result in an unintentional electrical discharge. For example, one or more recessed electrical contacts and/or spring actuated switches may be configured to prevent a user from contacting a portion of battery system 102 that may result in an unintentional electrical discharge. According to still further embodiments, an electronic handshake or other electrical communication may occur between discharging system 112 and a battery control system when discharging system 112 is connected to access points 104-108. Such embodiments may provide further protection against inadvertent discharge of battery system 102.

Figure 2:
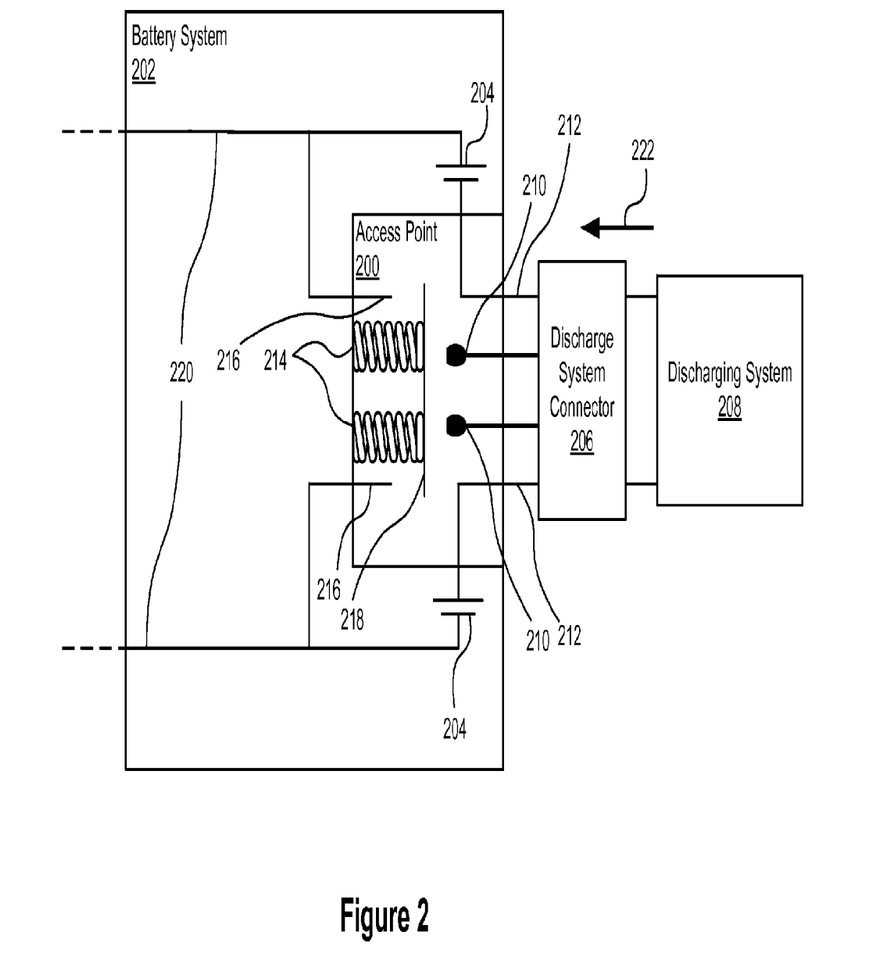
FIG. 2 illustrates an access point for discharging an HV battery system in a vehicle consistent with embodiments disclosed herein.

FIG. 2 illustrates an example of an access point 200 for discharging a battery system 202 in a vehicle consistent with embodiments disclosed herein. Particularly, the illustrated access point 200 may be included in and/or associated with an MD (e.g., an MD receptacle) of battery system 202. In some embodiments, when MD is removed from the MD receptacle, access point 200 may be made accessible, thereby allowing a user to connect a discharging system 208 to access point 200 via a discharging system connector 206 and perform discharging operations. In further embodiments, access point 200 may be accessible by discharging system 208 regardless of whether the MD is removed from the MD receptacle.

As illustrated, access point 200 and/or the MD receptacle may be located in a midpoint of cell stack 204 of battery system 202. In further embodiments, access point 200 may be located in any suitable location relative to the internal architecture of battery system 202 and/or cell stack 204. Cell stack 204 may be configured to provide HV electrical energy from battery system 202 to various vehicle systems (e.g., vehicle drivetrain systems) across a HV bus 220.

Discharging system connector 206 may be configured to electrically connect a discharging system 208 with access point 200. As discussed above, discharging system 208 may comprise one or more electrical loads suitably sized to discharge battery system 202 at a desired rate when electrically connected to access point 200 via discharging system connector 206. Discharging system 208 and/or discharging system connector 206 may be configured to allow for discharging operations to be performed in field situations (e.g., during roadside rescue operations by public safety personnel) and, accordingly, may be configured as portable and/or semi-portable systems.

Discharging system connector 206 may include one or more actuators 210 which, as illustrated, may be mechanical actuators or pins. When connected to access point 200 (e.g., by pushing discharging system connector 206 into access point 200 in the direction indicated by arrow 222) actuators 210 may be configured to mechanically compress one or more spring mechanisms 214 included in access point 200, thereby causing a contact plate 218 coupled to the spring mechanisms 214 to come into electrical contact with contacts 216 coupled to the HV bus 220. Connecting discharging system connector 206 to access point 200 may further cause the discharging system connector 206 to come into contact with HV lines 212. In this manner, a complete circuit may be formed between cell stack 204 and discharging system connector 206 and/or discharging system 208, thereby causing HV electrical energy stored in cell stack 204 to discharge into one or more loads included in discharging system 208.

In certain embodiments, spring mechanism 214 may be configured to only contact allow contact plate 218 to come into electrical contact with contacts 216 coupled to the HV bus 220 when actuated by actuators 210 (i.e., by connecting discharging system connector 206 to access point 200). In some embodiments, such a design may mitigate the potential for unintentional contact between contacts 216 and contact plate 218. In further embodiments, components of access point 200 and/or discharging system connector 206 may comprise isolative or non-conductive materials (e.g., plastic or the like). For example, actuators 210 may be comprised of an isolative and/or non-conductive material such as plastic. Similarly, an interface between contact plate 218 and actuators 210 may be comprised of an isolative and/or non-conductive material such as plastic.

As noted above, connecting discharging system connector 206 to access point 200 may cause an electrical connection across HV bus 220. In circumstances where one or more HV contactors (not shown) are shorted and external short occurs, the electrical connection across HV 220 bus may open a fuse associated with battery system 202, thereby reducing the likelihood of unintentional discharge. Accordingly, such certain circumstances, connecting discharging system connector 206 to access point 200 may provide an additional degree of safety.

In certain embodiments, discharging system connector 206 may come into electrical contact with HV lines 212 when connected to access point 200 using a plug mechanism. In some embodiments, discharging system connector 206 may come into electrical contact with HV lines 212 using one or more recessed electrical contacts. In further embodiments, contact plate 218 may contact actuators 210 through one or more recessed channels in access point 200. Utilizing recessed electrical contacts and/or components in access point 200 may, in certain embodiments, prevent a user from inadvertently contacting electrically energized portions of battery system 202 (e.g., with a finger or the like) that may result in an unintentional electrical discharge.

Figure 3:
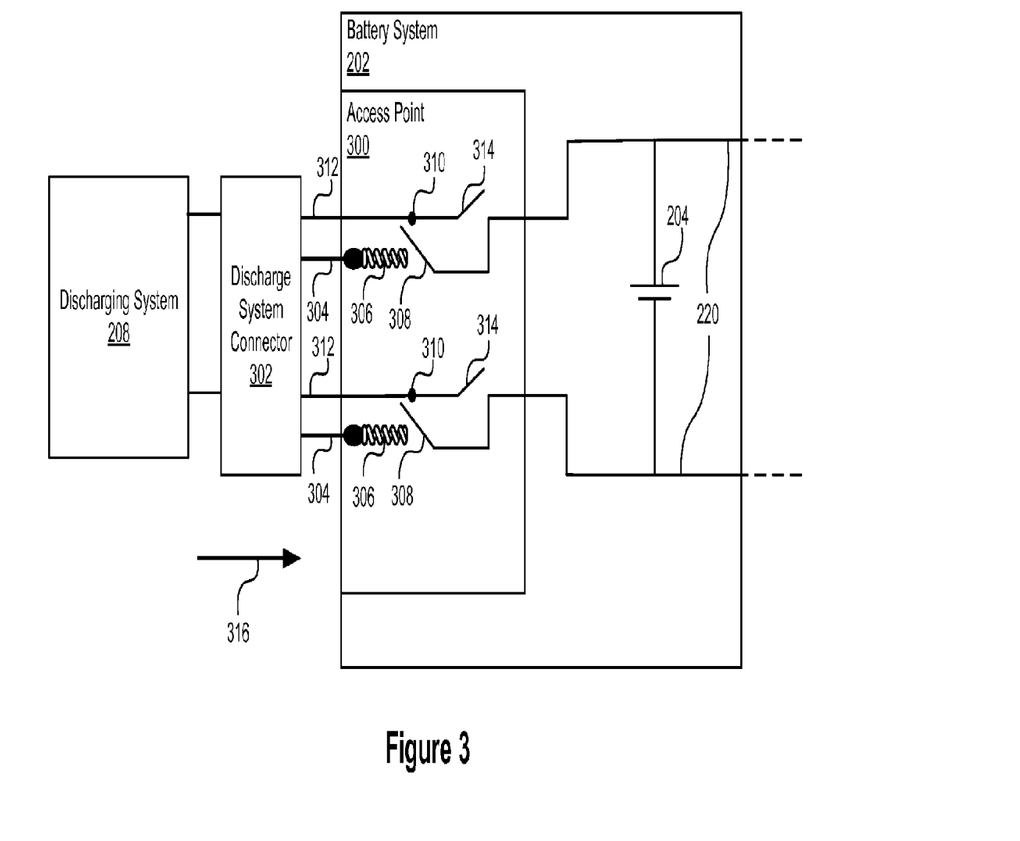
FIG. 3 illustrates another access point for discharging an HV battery system in a vehicle consistent with embodiments disclosed herein.

FIG. 3 illustrates another example of an access point 300 for discharging a battery system 202 in a vehicle consistent with embodiments disclosed herein. Certain illustrated elements may be similar to elements illustrated in and described in reference to FIG. 2 and, accordingly, similar elements may be denoted with like numerals. The illustrated access point 300 may be included in and/or associated with a HV power feed of battery system 202. The HV power feed may be utilized in charging operations of battery system 202. For example, the HV power feed may include a receptacle configured to interface with a suitable charging connector (e.g., a SAE J1772 standard connector or the like) configured to charge battery system 202. Access point 300 may be integrated into the receptacle and be configured to connect with discharging system 208 when a discharging system connector 302 associated with discharging system 208 is connected to the receptacle or a portion of the receptacle including access point 300.

Discharging system connector 302 may be configured to electrically connect a discharging system 208 with access point 300. Discharging system 208 may comprise one or more electrical loads suitably sized to discharge battery system 202 at a desired rate when electrically connected to access point 300 via discharging system connector 302. Discharging system 208 and/or discharging system connector 302 may be configured to allow for discharging operations to be performed in field situations (e.g., during roadside rescue operations by public safety personnel) and, accordingly, may be configured as portable and/or semi-portable systems. Further, discharging system 208 may be utilized during certain maintenance operations performed at an automobile maintenance facility.

Discharging system connector 302 may include one or more actuators 304 which, as illustrated, may be mechanical actuators or pins. When connected to access point 300 (e.g., by pushing discharging system connector 302 into access point 300 in the direction indicated by arrow 316) actuators 304 may be configured to mechanically compress one or more spring mechanisms 306 included in access point 300, thereby causing spring-actuated bypass switches 308 to close to contact points 310, thereby coupling discharging system connector 302 with the HV bus 220 via HV lines 312. In certain embodiments, causing spring-actuated bypass switches 308 to close to contact points 310 may bypass HV power feed switches 314, which may be closed during charging operations and otherwise be open, thereby connecting HV lines 312 to HV bus 220 regardless of the state of HV power feed switches 314. By bypassing HV power feed switches 314, a complete circuit may be formed between cell stack 204 and discharging system connector 302 and/or discharging system 208, thereby causing HV electrical energy stored in cell stack 204 to discharge into one or more loads included discharging system 208.

In some embodiments, components of access point 300 and/or discharging system connector 302 may comprise isolative or non-conductive materials (e.g., plastic or the like). For example, actuators 304 may be comprised of an isolative and/or non-conductive material such as plastic.

In certain embodiments, discharging system connector 302 may come into electrical contact with HV lines 312 when connected to access point 300 using a plug mechanism. In some embodiments, discharging system connector 302 may come into electrical contact with HV lines 312 using one or more recessed electrical contacts. In further embodiments, actuators 304 may contact spring mechanisms 306 through one or more recessed channels in access point 300. Utilizing recessed electrical contacts and/or components in access point 300 may, in certain embodiments, prevent a user from inadvertently contacting a portion of battery system 202 (e.g., with a finger or the like) that may result in an unintentional electrical discharge.

Figure 4:
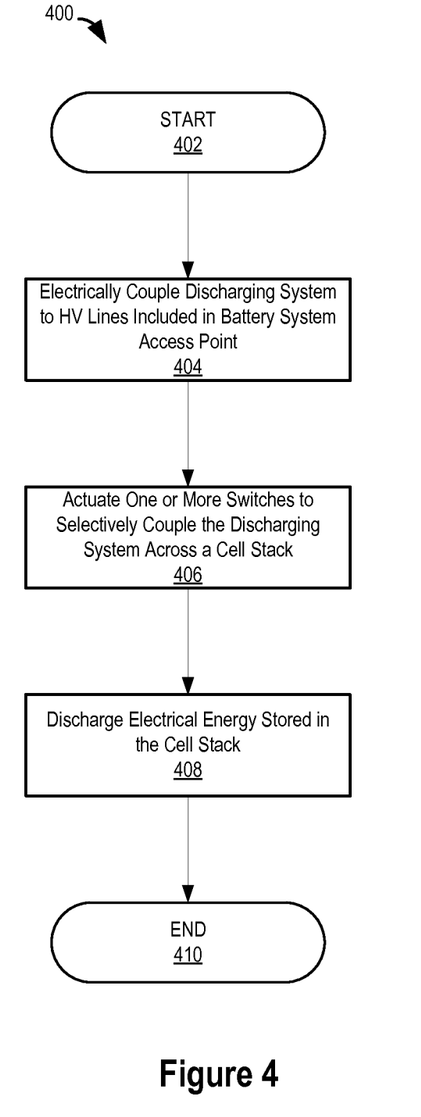
FIG. 4 illustrates a flow chart of an example of a method for discharging an HV battery system in a vehicle consistent with embodiments disclosed herein.

FIG. 4 illustrates a flow chart of an example of a method 400 for discharging a battery system in a vehicle consistent with embodiments disclosed herein. The illustrated method 400 may be performed using, at least in part, a discharging system connector, a discharging system, and/or one or more access points as described herein. At 402, the method 400 may be initiated. At 404, a discharging system may be electrically coupled to one or more HV lines included in an access point of the battery system. The access point may be included in an MD of the vehicle's battery system, a HV power feed of the vehicle's battery system, and/or any other suitable location on the vehicle (e.g., one or more redundant locations).

The discharging system may be electrically coupled to the HV lines using a discharging system connector that, in certain embodiments, may incorporate features and/or functionality of the discharging system connectors described and illustrated above in reference to FIG. 2 and FIG. 3. In some embodiments, discharging system may be electrically coupled to the HV lines using one or more recessed electrical contacts included in the discharging system connector. In certain embodiments, utilizing recessed electrical contacts and/or components may prevent a user from inadvertently contacting a portion of the battery that may result in an unintentional electrical discharge.

At 406, one or more switches configured may be actuated to selectively couple the discharging system across a cell stack of the battery system. Coupling the discharging system across the cell stack may allow one or more electrical loads included in the discharging system to discharge the battery system and/or cell stack at a desired rate. In certain embodiments, the one or more switches may be mechanically-actuated spring switches actuated using one or more mechanical actuators and/or pins. For example, a discharging system connector may include one or more actuators and/or pins that when inserted into one or more channels (e.g., recessed channels) in an access point, cause the one or more switches to selectively couple the discharging system across a cell stack of the battery system.

In certain embodiments, step 406 may be performed simultaneously and/or substantially simultaneously to step 404. For example, in some embodiments, step 404 may be performed substantially simultaneous to step 406 when a discharging system connector is inserted into an access point.

At step 408, the discharging system may discharge the battery system (e.g., discharge electrical energy stored in a cell stack of the battery system). For example, discharging system may discharge electrical energy stored in the battery system through one or more electrical loads included in the discharging system. In certain embodiments, the one or more loads may be suitable sized to discharge the battery system at a desired rate. Once the battery system has been discharged (e.g., discharged to a discharged threshold level), method 400 may terminate at 410.

Although the foregoing has been described in some detail for purposes of clarity, it will be apparent that certain changes and modifications may be made without departing from the principles thereof. For example, in certain embodiments, access points and/or discharging system connectors may use any combination of plugs, contacts, recessed elements, actuators, pins, recessed channels, mechanical and/or spring-actuated switches or relays, electrical actuated switches (e.g., solenoids and/or micro-solenoids) and/or any other suitable electrical system and/or mechanical system to facilitate the functionality of the access points and/or discharging system connectors described herein. Similarly, certain features of the embodiments disclosed herein may be configured and/or combined in any suitable configuration or combination. Additionally, certain systems and/or methods disclosed herein may be utilized in battery systems not included in a vehicle (e.g., a backup power battery system or the like). It is noted that there are many alternative ways of implementing both the processes and apparatuses described herein. Accordingly, the present embodiments are to be considered illustrative and not restrictive, and the invention is not to be limited to the details given herein, but may be modified within the scope and equivalents of the appended claims.

The foregoing specification has been described with reference to various embodiments. However, one of ordinary skill in the art will appreciate that various modifications and changes can be made without departing from the scope of the present disclosure. For example, various operational steps, as well as components for carrying out operational steps, may be implemented in alternate ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

As used herein, the terms "comprises" and "includes," and any other variation thereof, are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "coupled," "coupling," and any other variation thereof are intended to cover a physical connection, an electrical connection, a magnetic connection, an optical connection, a communicative connection, a functional connection, and/or any other connection.

Those having skill in the art will appreciate that many changes may be made to the details of the above-described embodiments without departing from the underlying principles of the invention. The scope of the present invention should, therefore, be determined only by the following claims.

The invention claimed is:

1. A battery system included in a vehicle, the battery system comprising:
   a high voltage cell stack; and
   at least one access point configured to selectively couple the high voltage cell stack with a discharging system connector, the at least one access point comprising:
      a receptacle configured to receive the discharging system connector;
      one or more high voltage contacts disposed in the receptacle configured to contact with one or more conductors included in the discharging system connector when the discharging system connector is received in the receptacle; and
      one or more selectively actuated switches disposed in the receptacle configured to electrically couple the one or more high voltage contacts across the high voltage cell stack when the discharging system connector is received in the receptacle.

2. The battery system of claim 1, wherein the at least one access point is associated with a manual disconnect of the battery system.

3. The battery system of claim 2, wherein the one or more selectively actuated switches are further configured to couple the one or more high voltage contacts across the high voltage cell stack by creating a short across a high voltage bus of the high voltage cell stack.

4. The battery system of claim 1, wherein the at least one access point is associated with a high voltage power feed of the battery system.

5. The battery system of claim 4, wherein the one or more selectively actuated switches are further configured to couple the one or more high voltage contacts across the high voltage cell stack by bypassing one or more power feed switches included in the battery system.

6. The battery system of claim 1, wherein system further comprises a plurality of redundant access points configured to selectively couple the high voltage cell stack with a discharging system connector.

7. The battery system of claim 1, wherein the one or more selectively actuated switches are configured to be actuated by one or more pins included in the discharging system connector when the discharging system connector is received in the receptacle.

8. The battery system of claim 1, wherein at least one of the one or more high voltage contacts or the selectively actuated switches are disposed in one or more recessed channels included in the receptacle.

9. A discharging system configured to discharge a battery system included in a vehicle, the discharging system comprising:
a load configured to consume electrical energy provided by the battery system;
a discharging system connector configured to couple the load to the battery system via at least one access point included in the vehicle, the discharging system connector comprising:
one or more conductors configured to contact one or more high voltage contacts included in the at least one access point when the discharging system connector is received in a receptacle associated with the access point; and
one or more actuators configured to selectively actuate one or more switches to couple the high voltage contacts across a high voltage cell stack of the battery system when the discharging system connector is received in the receptacle.

10. The discharging system of claim 9, wherein the load is configured to consume electrical energy provided by the battery system at a predetermined rate.

11. The discharging system of claim 9, wherein the one or more actuators comprise pins configured to selectively actuate the one or more switches using a spring mechanism.

12. The discharging system of claim 9, wherein the access point is included in a manual disconnect of the battery system.

13. The discharging system of claim 9, wherein the access point is included in a high voltage power feed of the battery system.

14. The discharging system claim 9, wherein the access point is a redundant access point of a plurality of access points included in the vehicle.

15. The discharging system of claim 9, wherein the one or more conductors are configured to contact the one or more high voltage contacts via one or more recessed channels included in the receptacle.

16. The discharging system of claim 9, wherein the one or more actuators are configured to selectively actuate the one or more switches via one or more recessed channels included in the receptacle.

17. A vehicle comprising;
a high voltage battery system; and
a plurality of redundant access points coupled the high voltage battery system, each redundant access point configured to receive a discharging system connector associated with a discharging system configured to discharge the high voltage battery system when coupled to the redundant access point.

18. The vehicle of claim 17, wherein at least one redundant access point of the plurality of redundant access points is included in a manual disconnect.

19. The vehicle of claim 17, wherein at least one redundant access point of the plurality of redundant access points is included in a high voltage power feed for the battery system.

20. The vehicle of claim 17, wherein each redundant access point comprises a receptacle configured to receive a discharging system connector.

* * * * *